(No Model.) 3 Sheets—Sheet 1.

O. B. PECK.
PROCESS OF SEPARATING POWDERED OR FINELY DIVIDED PARTICLES, &c.

No. 479,455. Patented July 26, 1892.

Witnesses:
Chas. E. Gaylord.
Clifford H. White.

Inventor:
Orrin B. Peck.
By Banning & Banning & Payson,
Att'ys.

(No Model.) 3 Sheets—Sheet 2.
O. B. PECK.
PROCESS OF SEPARATING POWDERED OR FINELY DIVIDED PARTICLES, &c.
No. 479,455. Patented July 26, 1892.
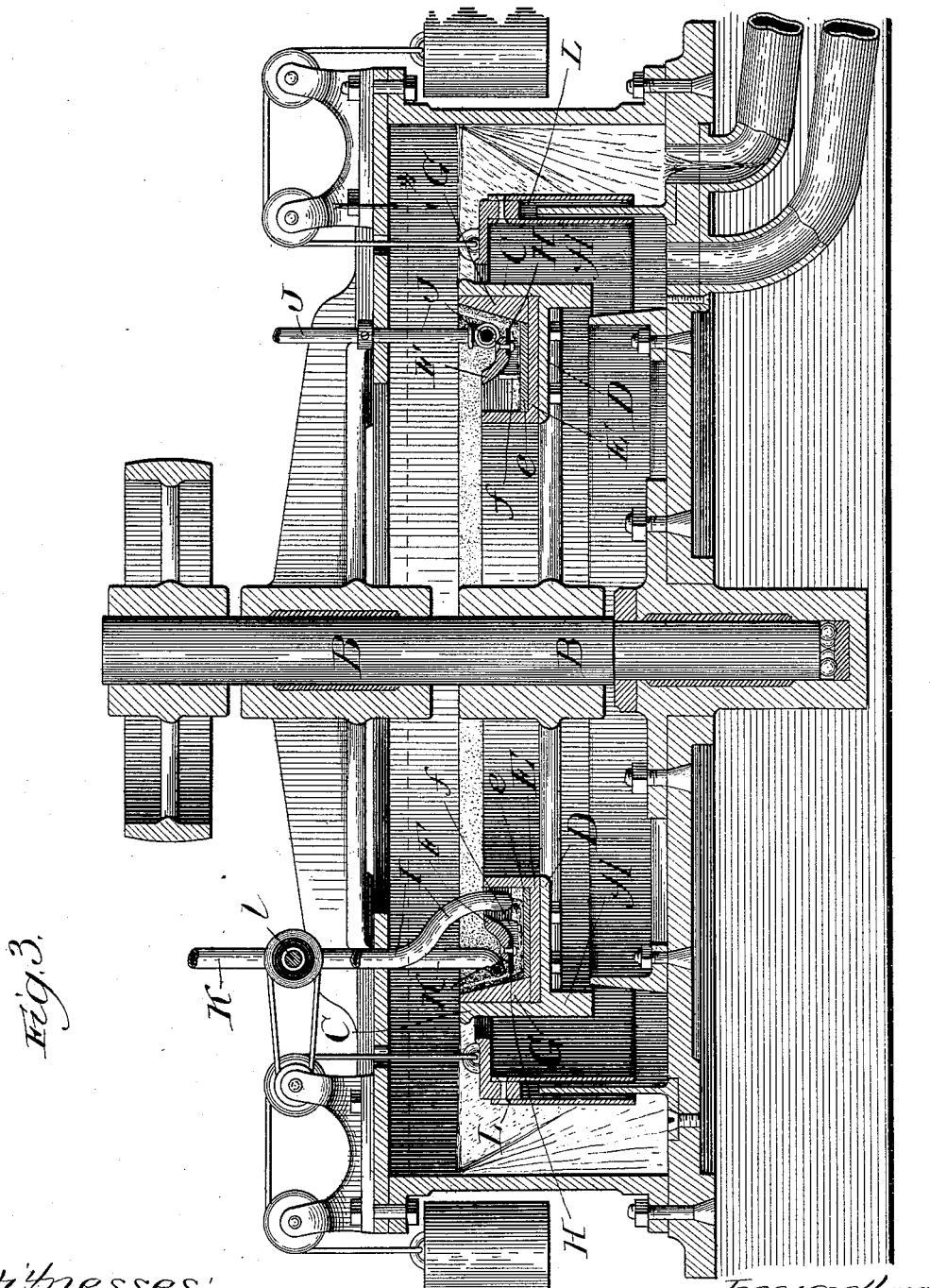

(No Model.) 3 Sheets—Sheet 3.
O. B. PECK.
PROCESS OF SEPARATING POWDERED OR FINELY DIVIDED PARTICLES, &c.
No. 479,455. Patented July 26, 1892.
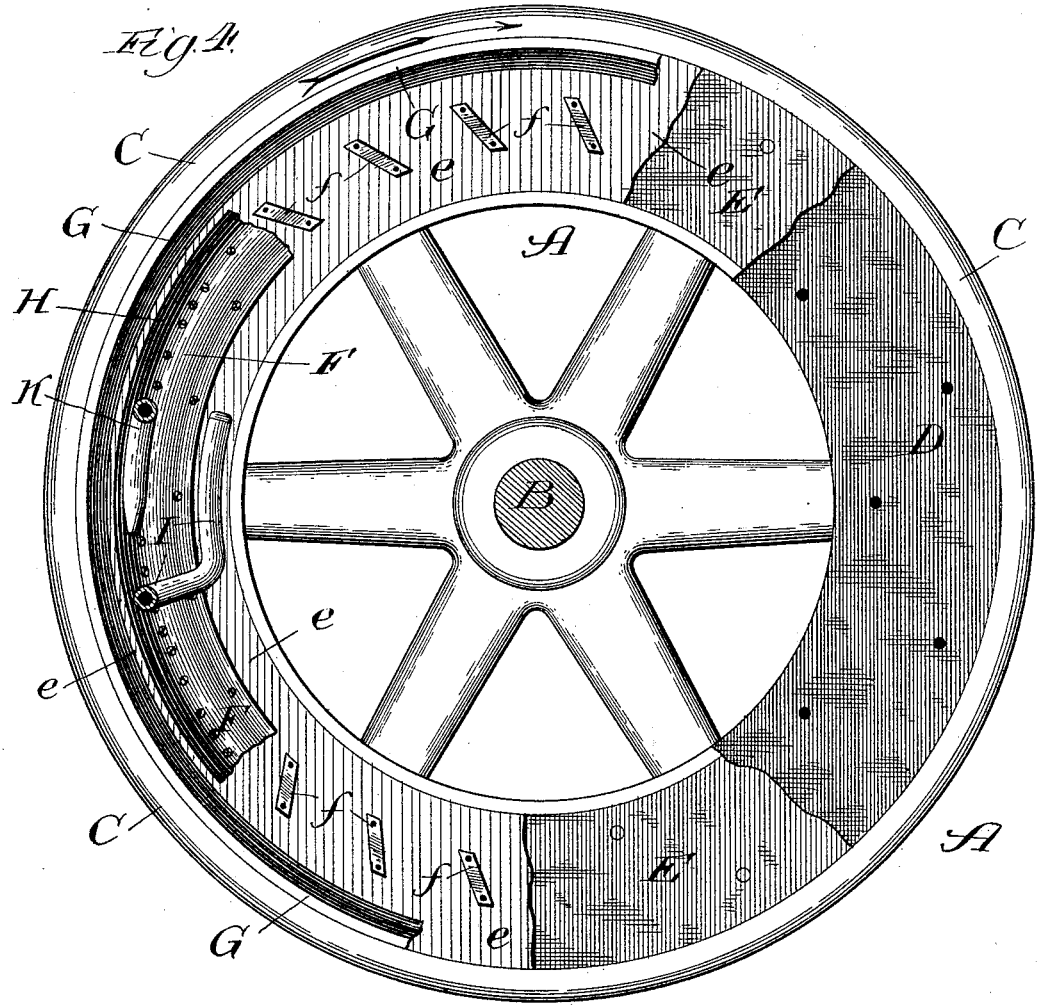
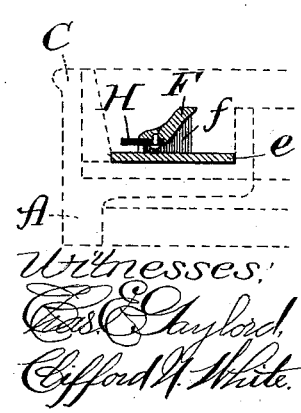
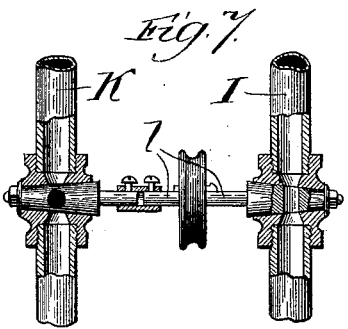
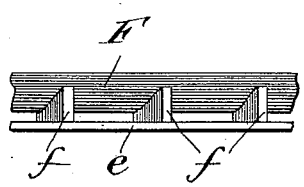
Witnesses:
Chas. E. Gaylord.
Clifford W. White.
Inventor:
Orrin B. Peck,
By Banning & Banning & Payson,
Attys.

UNITED STATES PATENT OFFICE.

ORRIN B. PECK, OF CHICAGO, ILLINOIS, ASSIGNOR TO MELINDA PECK, OF SAME PLACE.

PROCESS OF SEPARATING POWDERED OR FINELY-DIVIDED PARTICLES, &c.

SPECIFICATION forming part of Letters Patent No. 479,455, dated July 26, 1892.

Application filed January 11, 1892. Serial No. 417,681. (No specimens.)

*To all whom it may concern:*

Be it known that I, ORRIN B. PECK, a citizen of the United States, residing at Chicago, Illinois, have invented a certain new and useful Process of Separating Powdered or Finely-Divided Particles Containing Mineral-Bearing Substances of Different Degrees of Specific Gravity, of which the following is a specification.

Figure 1:
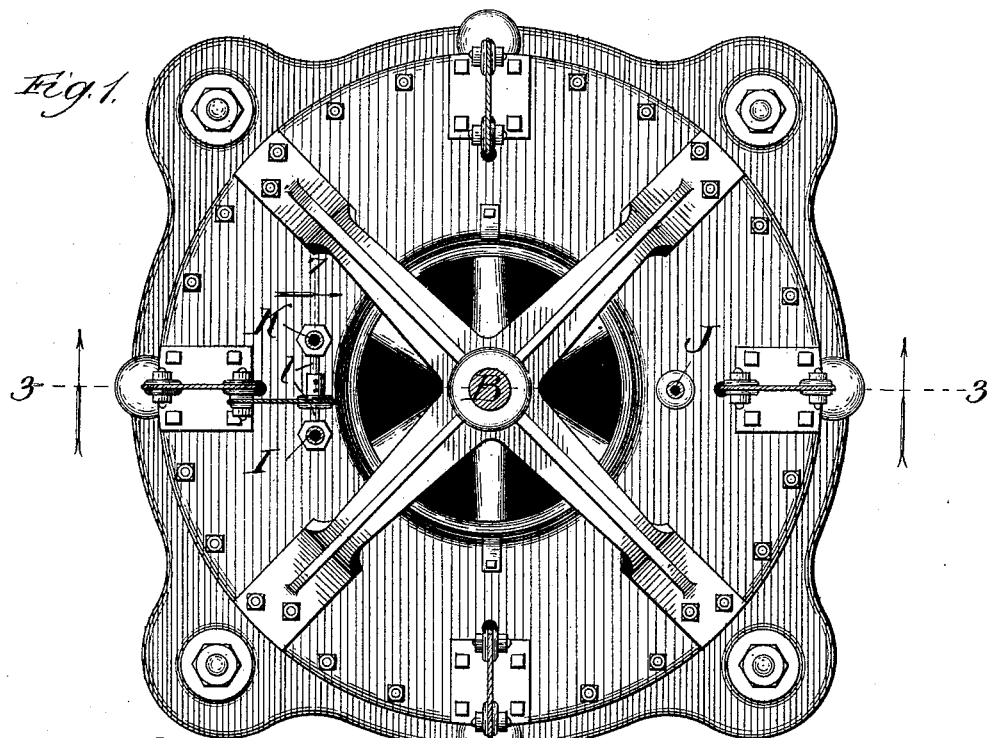
Figure 2:
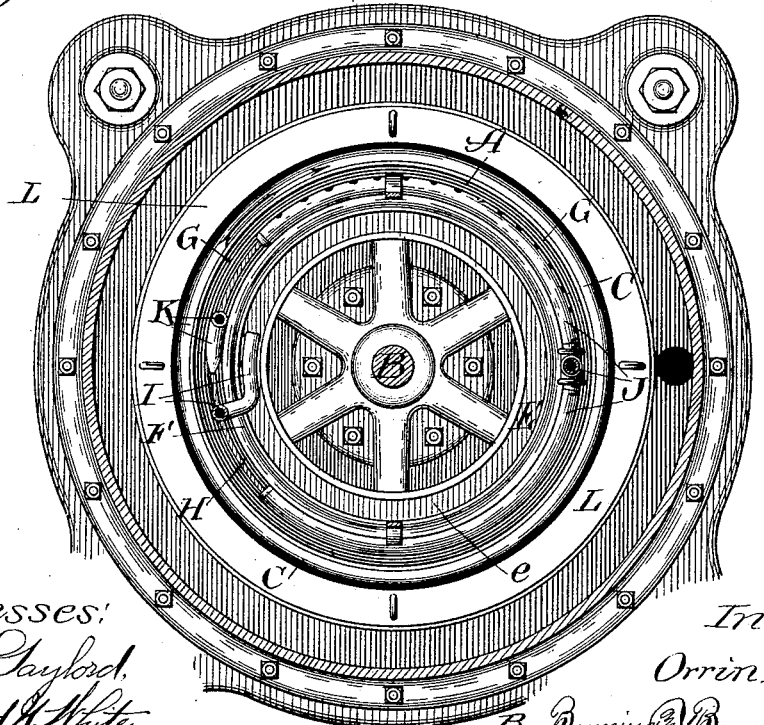

In the drawings, Figure 1 is a plan view of the apparatus used by me in carrying my process into operation. Fig. 2 is a section of the apparatus, taken in the line 2 of Fig. 3, looking in the direction of the arrow. Fig. 3 is a transverse vertical section taken through the line 3 of Fig. 1, looking in the direction of the arrows. Fig. 4 is a broken plan view of the separating-wheels, and Figs. 5, 6, and 7 are details which will be hereinafter explained.

In carrying out my process for separating powdered or finely-divided particles containing mineral-bearing substances of different degrees of specific gravity I make what I term a "separating-wheel" A, intended to be mounted upon and revolved by a shaft B, which may be rotated by a pulley engaged by a belt driven by any convenient motive power or in any other convenient way. I prefer to support the rotatable shaft in suitable bearings and mount its lower end in a step, making a ball-bearing. As to these details, however, much latitude may be indulged. The separating-wheel A is preferably of large diameter and provided with spokes radiating from a central hub, as shown particularly in Fig. 4. It is preferably provided with a rim C, of some considerable depth, with an inwardly-projecting flange D, extending toward the hub a requisite distance to afford the necessary space to accommodate the matter intended to be treated or the parts on which the matter is directly or immediately deposited for treatment.

As illustrated in the drawings, a flat ring E, angle-shaped around its inner edge, is arranged directly on the inwardly-projecting flange D of the separating-wheel, and on this is again placed a wearing-plate e, on which the material to be treated is deposited. It is obvious, however, that the inwardly-projecting flange D can be turned up at its inner edge and the material to be treated deposited directly upon it, thereby dispensing with the ring and wearing-plate.

As shown in the drawings, I have arranged an inwardly-inclined deflecting-plate F, supported on lugs *f*, so as to be held above the surface of the wearing-plate. This deflecting-plate is intended to operate as a cover to prevent the material being treated from spattering and insure its proper delivery to the edge of the separating-surface. I do not desire to limit myself to the particular shape of this guard or cover. The lugs also facilitate and assist the delivery of the material to the edge of the wheel as they force it toward the edge in the shortest path, instead of allowing it to slip along over the surface of the wheel. Sufficient space is preserved between the abutment-flange on the ring E and the inwardly-projecting edge of the deflecting-plate F to form an annular channel and permit of the introduction of the material to be treated between them. On the inside of the rim C, above the ring E, I have arranged an outwardly-inclined separating-surface ring G, which gives an angle or slope, if desired, to the wall of the separating-wheel and affords a surface on which the material to be saved may accumulate until removed, as hereinafter explained. I also prefer to so locate the outer edge of the deflecting plate or guide F with reference to the surface ring G as to leave but a small annular space between them, and to still further lessen this space by arranging a flexible ring H, made of rubber, leather, or other flexible material, below the deflecting or guide plate, so as to extend out toward the surface ring.

I introduce the material to be treated through a material-supply pipe I into the channel between the plate F and the vertical flange of the plate E, as particularly shown in Fig. 3. I introduce a water-supply pipe J, which is carried around on the inside of the separating-wheel and near the surface ring G a desired distance and provided with a number of holes or perforations, through which the water may be gently sprayed against the surface of the ring G while the separation of the material subjected to treatment is being carried on.

As shown in Fig. 2, the water-spraying pipe is carried around about three-fourths of the distance of the interior of the separating-wheel; but I do not desire to limit myself to this or any other particular proportion or extent to which the spraying-pipe shall be arranged. Preferably at that portion of the separating-wheel between the ends of the spraying-pipe the material-supply pipe I is arranged, and a little back of the end of such pipe, as shown in Fig. 2, is introduced a hydraulic pipe K, with its end preferably turned in a direction opposite to the course of the rotation of the separating-wheel. This hydraulic pipe is intended to have proper connection with a force-pump or other suitable means for forcing one or more jets or streams of water with the desired force through it and against the separating surface ring G. As the material is introduced through the pipe I it falls on the wearing-plate and is immediately carried by the action of centrifugal force outward under the deflecting-plate F and up along the surface of the surface ring G, where it is subjected to the spraying action of the water flowing from the pipe J. While being carried around and subjected to this spraying of the water, the lighter particles, through the combined action of the water and of the centrifugal force to which they are subjected, are separated from the heavier and more valuable particles and driven or carried up over the surface ring and discharged over the rim of the separating-wheel into a suitable curbing or other receptacle to receive them, while the heavier and more valuable particles adhere to the surface ring until they have been carried farther around, when they are subjected to the force of the jets or streams of water driven in through the hydraulic pipe K, which detaches them from the surface, so that they are thrown off by the combined action of the jets or streams of water and the centrifugal force. To effect this, the jets or streams of water forced in through the pipe K are driven with greater force or power than the streams which spray upon the material being treated through the pipe J.

To prevent the heavier particles which it is desired to save from being forced over into the curbing or receptacle with the lighter particles, I have shown in the drawings an adjustable partition L, surrounding the revoluble separating-wheel, and means for periodically raising and lowering this partition, so that the particles passing over the rim of the separating-wheel will be caught within the partition or carried beyond it, as it may be up or down. These means consist of weights and pulleys, and I have so connected the pipes K and I with a shaft $l$, carrying a pulley by which the shaft may be rotated in one direction or the other to close the pipe I while the pipe K is being opened, or to open the pipe I while the pipe K is being closed, so as to shut off the supply of material when the jets or streams of water are being introduced.

The arrangement of the shaft $l$ and the valves is illustrated in Fig. 7; but any other sufficient means may be employed for closing the material-pipe when the hydraulic pipe is being opened. If preferred, however, the material-supply pipe I, supplying material, and the water-supply pipe J, supplying water to assist in removing the lighter particles, and the hydraulic pipe K, supplying jets or streams of water to assist in removing the heavier particles, may constantly remain open, and means for saving the heavier and more valuable particles thus constantly washed and thrown off may be used, so that the process of separating the lighter particles and saving the heavier particles may be carried on continuously and simultaneously. I have shown such means in another application filed simultaneously with this and serially numbered 417,682, in which I claim the mechanism, and merely mention it here to show that I contemplate and propose to use such means.

Many modifications of the mechanical means for carrying out my process will readily suggest themselves, and I do not, therefore, desire to limit myself to the details of construction of the mechanism shown and described.

Instead of depositing the material to be treated at or near the center of the treatment-vessel, I deposit it, in the process made the subject of claim in this specification, near the outer circumference of the wheel and as far as practicable from the center, and pass it under the plate, guard, or cover to prevent spattering and to insure the proper delivery of the material.

What I regard as new, and desire to secure by Letters Patent in this specification, is—

1. The process of separating powdered or finely-divided particles containing mineral-bearing substances of different degrees of specific gravity, which consists in subjecting such particles to the action of centrifugal force and then discharging the heavier particles from the action of centrifugal force by jets or streams of water under pressure, substantially as described.

2. The process of separating powdered or finely-divided particles containing mineral-bearing substances of different degrees of specific gravity, which consists in subjecting such particles to the action of centrifugal force, assisting in discharging the lighter particles from the action of centrifugal force by gentle sprays of water, and then assisting in discharging the heavier particles from the action of centrifugal force by jets or streams of water under pressure, substantially as described.

3. The process of separating powdered or finely-divided particles containing mineral-bearing substances of different degrees of specific gravity, which consists in subjecting such particles to the action of centrifugal force and currents or sprays of water and then discharging the heavier particles from the action of centrifugal force by the combined action of centrifugal force and hydraulic streams or jets of water, substantially as described.

4. The process of separating powdered or finely-divided particles containing mineral-bearing substances of different degrees of specific gravity, which consists in subjecting such particles to the action of centrifugal force at one place and discharging the lighter particles from the action of centrifugal force at another place farther around in the direction of revolution and discharging the heavier particles from the action of centrifugal force at another place farther around in the direction of revolution, substantially as described.

ORRIN B. PECK.

Witnesses:
   THOMAS A. BANNING,
   MARIE L. PRICE.